Patented Dec. 30, 1952

2,623,898

UNITED STATES PATENT OFFICE 2,623,898

CYCLOHEPTATRIEN-1-OL-2-ONE MONO-SULFONIC ACIDS AND PROCESS FOR MANUFACTURING SAME

Edward G. Howard, Jr., Wilmington, Del., assignor to E. I. du Pont de Nemours and Company, Wilmington, Del., a corporation of Delaware No Drawing. Application June 4, 1951,
Serial No. 229,880

11 Claims. (Cl. 260—503)

This invention relates to new compositions of matter and to a method for their preparation. More particularly this invention relates to a new class of compounds containing a seven-membered carbocyclic ring and to a novel process for their preparation.

Compounds containing seven-membered rings occur in several natural products. Such compounds in general possess valuable properties with respect to regulating plant growth as well as in pesticidal applications. Of particular interest are carbocyclic compounds, especially those containing the cycloheptatrien-1-ol-2-one ring. These compounds have unique chemical properties but they are generally insoluble in water. Cycloheptatrien-1-ol-2-one (tropolone) has received considerable attention in recent years, since the cycloheptatrien-1-ol-2-one ring exists in certain biologically active products, such as colchicine and fungicides including the thujaplicins which are part of the active portions in cedar wood. New compounds which contain this ring system and which are water soluble or form water soluble salts would be advantageous in many applications.

It is an object of this invention to provide new compositions of matter and a method for their preparation. A further object is to provide a new class of compounds containing a seven-membered carbocyclic ring and a novel process for their preparation. A still further object is to provide a new class of compounds containing the cycloheptatrien-1-ol-2-one ring which are water soluble. Other objects will appear hereinafter.

The objects of this invention are accomplished by providing a new class of sulfonated chemical compounds containing the cycloheptatrien-1-ol-2-one ring, the cycloheptatrien-1-ol-2-one sulfonic acids and their salts, and the halocycloheptatrien-1-ol-2-one sulfonic acids and their salts. These novel compounds are obtained by reacting cycloheptatrien-1-ol-2-one or a halocycloheptatrien-1-ol-2-one with a sulfonating reagent.

A particularly preferred process for the preparation of a product of this invention having the cycloheptatrien-1-ol-2-one ring containing a sulfonic acid substituent comprises the reaction of cycloheptatrien-1-ol-2-one or a bromocycloheptatrien-1-ol-2-one with a sulfuric acid-sulfur trioxide mixture as the sulfonating reagent.

Tropolone, cycloheptatrien-1-ol-2-one has the structural formula

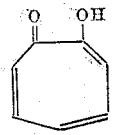

The new compounds of this invention include tropolonesulfonic acids and their salts having the structural formula

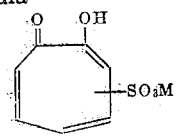

wherein M is hydrogen or a metal.

The new compounds of this invention also include halotropolonesulfonic acids and their salts having the structural formula

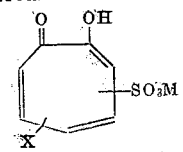

wherein X is halogen, particularly bromine or chlorine and M is hydrogen or a metal.

The following examples in which the parts are by weight further illustrate this invention.

Example I

A mixture of 2.44 parts of cycloheptatrien-1-ol-2-one (obtained by the process of Cook et al., Chem. and Ind. 1950, 427) and 16 parts of sulfuric acid containing 25% sulfur trioxide was heated at 90° C. for 3 hours. The mixture was cooled and poured on 100 parts of ice. The product obtained was filtered and the unreacted cycloheptatrien-1-ol-2-one was recovered by extraction with 5 portions of 30 parts each of chloroform. A total of 1.7 parts of the cycloheptatrien-1-ol-2-one was obtained upon evaporation of the chloroform extract. The liquid portion gave a strong green color with ferric chloride, which is characteristic of the cycloheptatrien-1-ol-2-ones. To the water solution which contained the cycloheptatrien-1-ol-2-one sulfonic acid, barium carbonate was added until the mixture turned yellow, at which point the liquid portion gave no ferric chloride test for cycloheptatrien-1-ol-2-one. The precipitate was treated with a small amount of sulfuric acid, which was sufficient to remove the yellow color. After filtration the filtrate was evaporated to dryness, leaving a yellow solid. It was recrystallized from water and had the following analysis.

Found: C, 22.83%, 22.70%; S, 8.71%, 8.48%; H, 2.52%, 2.37%; Ba, 35.07%, 35.05%.

Calc. for $C_7H_4O_5SBa \cdot xH_2O$ (Barium salt of cycloheptatrien-1-ol-2-one sulfonic acid)

Where $x=2$: C, 22.51%; S, 8.58%; H, 2.16%; Ba, 36.72%.

Where $x=3$: C, 21.87%; S, 8.19%; H, 2.57%; Ba, 35.08%.

The recrystallized product amounted to 0.3 part. The addition of ethyl alcohol to the water from which the crystallization occurred gave an additional 0.1 part of the barium salt.

The cycloheptatrien-1-ol-2-one sulfonic acid can be obtained from the salt by adding an equivalent amount of $H_2SO_4$ to a water solution of the salt, removing the $BaSO_4$ by filtration, and evaporating the filtrate.

*Example II*

A mixture of 3.02 parts of 3-bromocycloheptatrien-1-ol-2-one (prepared by the process of Cook et al., J. Chem. Soc. 503 (1951)) and 6 parts of sulfuric acid containing 25% of sulfur trioxide was heated at 100° C. for 7 hours. After the mixture was poured into water, 2.55 parts of the bromocycloheptatrien-1-ol-2-one was recovered by filtration of the precipitate. The filtrate was extracted four times with 30 parts each of chloroform. The aqueous portion gave a strong green coloration with ferric chloride. To the aqueous solution containing the bromocycloheptatrien-1-ol-2-one sulfonic acid, barium hydroxide was added until the solution was almost neutral. The barium sulfate was removed by filtration and the water was removed from the filtrate without subjecting it to high temperatures. Long, needle-like crystals formed which gave an intense green color when dissolved in water containing ferric chloride. The crystals were soluble in water and methanol, moderately soluble in acetone and acetonitrile, and insoluble in ether.

The crystals were redissolved in water, neutralized with barium hydroxide solution and the yellow precipitate thus obtained was recrystallized from water. After drying at 100° C. under vacuum, 0.3 part of product was obtained. This product was the barium salt of a bromocycloheptatrien-1-ol-2-one sulfonic acid and had the following analysis.

Found: C, 19.44%, 19.24%; H, 1.21%, 1.16%.
Calc. for $C_7H_3O_5BrSBa \cdot H_2O$: C, 19.25%; H, 1.16%.

The bromocycloheptatrien-1-ol-2-one sulfonic acid can be obtained from the salt by adding an equivalent amount of $H_2SO_4$ to a water solution of the salt, removing the $BaSO_4$ by filtration and evaporating the filtrate.

In place of the cycloheptatrien-1-ol-2-one as employed in the first example, a halocycloheptatrien-1-ol-2-one can be used. The most suitable and preferred are those which contain bromine or chlorine as substituents on the carbocyclic ring. Thus, there can be used chloro and bromocycloheptatrien-1-ol-2-ones, the latter being shown in Example II.

Sulfonating agents that can be used include fuming sulfuric acid (mixtures of sulfur trioxide in sulfuric acid), chlorosulfonic acid, or dioxane-disulfur trioxide, the addition complex of dioxane with sulfur trioxide.

The exact conditions for the sulfonating reaction depend upon the specific reagent employed. In view of its availability, mixtures of sulfuric acid with sulfur trioxide are preferred. Temperatures of 50–125° C. or higher are useful. Satisfactory yields are generally obtained at temperatures of about 100° C. when the time of reaction is 2 to 10 hours. With chlorosulfonic acid the time and temperature can be reduced.

The amount of effective sulfonating agent present should be at least as high on a molar basis as the amount of the carbocyclic compound present.

With the use of the above reactants there can be prepared cycloheptatrien-1-ol-2-one monosulfonic acids and their salts, and halocycloheptatrien-1-ol-2-one monosulfonic acids and their salts, such as bromo and chlorocycloheptatrien-1-ol-2-one monosulfonic acids and their salts. Salts other than the barium salt can be readily prepared in the same manner by substituting for barium hydroxide other metal hydroxides, such as sodium or potassium hydroxide.

The sulfonated compounds of this invention can be employed in the formulation of biologically active products or as intermediates for further chemical reactions. The sulfonic acid group is susceptible to salt formation with various organic and inorganic bases. These compounds and derivatives are generally water soluble, e. g., they are not extracted from a water solution by such solvents as chloroform or ether. They provide hitherto unavailable water soluble cycloheptatrien-1-ol-2-one derivatives which are of particular use in the formulation of pesticidal, fungicidal, or plant regulant materials.

As many apparently widely different embodiments of this invention may be made without departing from the spirit and scope thereof, it is to be understood that this invention is not limited to the specific embodiments thereof except as defined in the appended claims.

I claim:

1. A sulfonated compound containing the cycloheptatrien-1-ol-2-one ring and selected from the class consisting of cycloheptatrien-1-ol-2-one monosulfonic acids, halocycloheptatrien-1-ol-2-one monosulfonic acids, and their salts.
2. A cycloheptatrien-1-ol-2-one monosulfonic acid.
3. A salt of a cycloheptatrien-1-ol-2-one monosulfonic acid.
4. The barium salt of a cycloheptatrien-1-ol-2-one monosulfonic acid.
5. A halocycloheptatrien-1-ol-2-one monosulfonic acid.
6. A bromocycloheptatrien-1-ol-2-one monosulfonic acid.
7. The barium salt of a bromocycloheptatrien-1-ol-2-one monosulfonic acid.
8. A process for preparing a sulfonated compound containing the cycloheptatrien-1-ol-2-one ring which comprises heating a member selected from the class consisting of cycloheptatrien-1-ol-2-one and halocycloheptatrien-1-ol-2-ones with fuming sulfuric acid.
9. A process for preparing a cycloheptatrien-1-ol-2-one monosulfonic acid which comprises heating cycloheptatrien-1-ol-2-one with fuming sulfuric acid.
10. A process for preparing a halocycloheptatrien-1-ol-2-one monosulfonic acid which comprises heating a halocycloheptatrien-1-ol-2-one with fuming sulfuric acid.
11. A process for preparing a bromocycloheptatrien-1-ol-2-one monosulfonic acid which comprises heating a bromocycloheptatrien-1-ol-2-one with fuming sulfuric acid.

EDWARD G. HOWARD, Jr.

No references cited.